United States Patent Office 3,629,207
Patented Dec. 21, 1971

3,629,207
PHOSPHORUS-CONTAINING POLYMERS
Denis Coleman, Stamford, Conn., assignor to American
Cyanamid Company, Stamford, Conn.
No Drawing. Original application May 5, 1966, Ser. No.
547,768, now Patent No. 3,517,087. Divided and this
application Sept. 12, 1969, Ser. No. 857,550
Int. Cl. C08g 33/02, 33/16
U.S. Cl. 260—79.3 R                    6 Claims

ABSTRACT OF THE DISCLOSURE

In an inert neutral organic solvent substantially free from water, tris-aziridinyl phosphine oxide and sulfide react with phosphoric acid and with sulfuric acid to form a precipitate of a 1:1 addition polymer which is insoluble, stable at elevated temperatures, and finely divided. Such novel polymers are useful as fire-retardant in fibers in which they can be dispersed by incorporation in the spin dope prior to extrusion.

---

This application is a division of application Ser. No. 547,768, filed May 5, 1966, now U.S. Patent 3,517,087.

This invention relates to new compounds and processes for preparing them. More particularly, this invention relates to some new polymeric compounds containing a high proportion of phosphorus and to methods for preparing such polymers in the form of finely divided powder having an average particle size below about 2 microns.

As these compounds contain a relatively high proportion of phosphorus, they are useful as flame-retardant additives to certain materials, such as polyurethanes, polystyrene, polyethylene, polypropylene, polymethyl methacrylate, and synthetic fibers such as rayon, acetate, spandex, and acrylics. Since the preferred process produces these polymeric materials as a finely divided powder, they may be incorporated in synthetic fibers by admixture to the spin dope prior to extrusion thereof to form fibers. Since these polymers are extremely insoluble in all solvents tested and are stable at elevated temperatures, these compounds may also be used in bulk shapes where extreme inertness is desired.

The polymer compounds of the present invention are poly-[tris(1-aziridinyl)phosphine oxide-phosphoric acid], poly-[tris(1-aziridinyl)phosphine oxide-sulfuric acid), poly-[tris(1-aziridinyl)phosphine sulfide-phosphoric acid] and poly-[tris(1-aziridinyl)phosphine sulfide-sulfuric acid].

These are prepared by the same general reaction, illustrated by the reaction of tris-(1-aziridinyl)phosphine oxide with phosphoric acid in the presence of an inert neutral organic solvent substantially free from water. This reaction produces a highly cross-linked extremely insoluble polymer of the present invention, in practically quantitative yield. The phosphorus content of this polymer is 22.9% corresponding to a polymer formed by 1:1 addition.

Illustrative of the inert neutral organic liquid solvents useful in performing the process of the present invention may be mentioned acetone, ethanol, benzene, toluene, xylene, methanol, isopropanol, diethyl ether, dioxane, tetrahydrofuran, chloroform, ethylene glycol, carbon tetrachloride, methylethyl ketone, ethyl acetate, petroleum hydrocarbons, dimethyl formamide, dimethyl acetamide, pyridine, and similar materials. For the performance of the present invention, the preferred solvents are acetone, ethanol, and isopropanol. The term "neutral" is intended to exclude those organic liquid solvents which contain active hydrogens, such as organic acids and primary and secondary amines.

In the performance of the process of the present invention, it is necessary that the inert neutral organic liquid solvent be substantially free from water. This means that less than about 20% water must be present, and preferably, less than about 1% water should be present in the reaction medium.

The reaction of the present invention to produce the novel products of the present invention is extremely rapid requiring no special precautions or operational techniques other than performance in the presence of the inert neutral organic liquid solvent substantially free from water. The tris-aziridinyl phosphine compound can be dissolved in one portion of the solvent and the acid dissolved in a second portion of the solvent. Either portion of solvent can be added to the other portion. The preferred procedure is to flow the two streams of solvent together in a mixing chamber provided with means for maintaining the reaction temperature somewhere around ambient temperature. This procedure is preferred for the production of the polymer in the form of a powder having average particle size below about 2 microns.

The polymer made using phosphoric acid and tris-aziridinyl phosphine oxide softens at 210–215° C. with slight decomposition and carbonizes at about 260° C. It is insoluble in water at room temperature and in all common organic solvents such as those mentioned above and used in its preparation. The infrared spectrum indicates the polymer to contain many

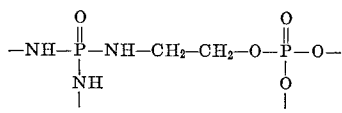

groups and no measurable amounts of any others. This compound is called poly-[tris(1-aziridinyl)phosphine oxide-phosphoric acid].

The polymer made using sulfuric acid and trisaziridinyl phosphine oxide softens at about 205° C. with slight decomposition and carbonizes at 220° C. to 230° C. It is insoluble in water at room temperature and in all common organic solvents such as those mentioned above and used in its preparation. The infrared spectrum indicates the polymer to contain many

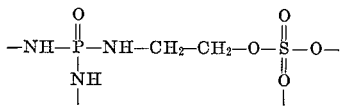

groups and no measurable amounts of any others. This compound is called poly-[tris(1-aziridinyl)phosphine oxide-sulfuric acid].

The corresponding phosphine sulfide polymers, made by substituting tris-aziridinyl phosphine sulfide in place of the tris-aziridinyl phosphine oxide in the reaction with phosphoric acid or sulfuric acid, have similar properties and are similarly named.

EXAMPLE 1

Simultaneous addition of phosphoric acid and tris-aziridinyl phosphine oxide 7.5 parts of tris-aziridinyl phosphine oxide in 50 parts of acetone was slowly added at the same time as 4.8 parts of 83% phosphoric acid in 50 parts of acetone to 100 parts of acetone kept vigorously stirred and cooled slightly to maintain temperature below 30° C. The reaction mixture was filtered and the precipitate washed with acetone, water and finally with acetone. The compound was found to contain 22.9% phosphorus and to have a softening point with slight decomposition of 210–215° C. A photomicrograph showed that the particles were in general less than 2 microns diameter.

EXAMPLE 2

Phosphoric acid added to tris-aziridinyl phosphine oxide 4.8 parts of 86% phosphoric acid in 25 parts of acetone was added to 7.5 parts of tris-aziridinyl phosphine oxide in 10 parts of acetone with ethanol cooling to maintain temperature greater than 30° C. The phosphorus content of the washed precipitate was 22.8%.

EXAMPLE 3

Tris-aziridinyl phosphine oxide added to phosphoric acid 7.5 parts of tris-aziridinyl phosphine oxide in 10 parts of acetone was added to 4.8 parts of 86% phosphoric acid in 28 parts of acetone with vigorous stirring and slight cooling. The precipitate was filtered off and washed with acetone, water and finally acetone. The phosphorus content of the well-washed precipitate was 22.9%.

EXAMPLE 4

Tris-aziridinyl phosphine oxide added to sulfuric acid

Ten parts of tris-aziridinyl phosphine oxide in 100 parts of acetone were added to 5 parts of sulfuric acid in 100 parts of acetone with stirring and cooling. The polymer was precipitated in a similar way to the corresponding polymer from phosphoric acid. The polymer contained 10.1% of phosphorus and 11.4% of sulfur.

EXAMPLE 5

Preparation of corresponding polymeric sulfides

In a manner similar to the foregoing examples, tris-aziridinyl phosphine sulfide can be reacted with phosphoric acid or sulfuric acid to produce the corresponding polymeric sulfides.

EXAMPLE 6

Incorporation of poly-[tris(1-aziridinyl)phosphine oxide-phosphoric acid] into fibers of acrylonitrile polymer One part of the polymer of Example 1 was added to 5 parts of 50% aqueous sodium thiocyanate and the mixture stirred vigorously. It was then moved with 200 parts of spinning solution consisting of 11.0% of acrylonitrile polymer dissolved in 45.0% aqueous sodium thiocyanate. This spinning solution was then spun through a 10 hole/200 micron jet. The coagulated gel was washed and stretched 12 times to give a fiber having excellent physical properties and containing 4.8% of the added polymer. Cross-sections of the fiber were examined by means of the light microscope and the electron microscope, and particles of added polymer of about 1 micron diameter predominated. The fiber dyed readily with basic dyes and the dyed fiber had an excellent stability to ultraviolet light.

EXAMPLE 7

Test of flame-retardancy of poly-[tris(1-aziridinyl) phosphine oxide-phosphoric acid]

The flame retardancy of pellets of acrylonitrile polymer and of acrylonitrile polymer mixed with 5.0% of the polymers of Example 1 were compared. A pellet (made by compressing the powder) was supported horizontally and a small flame applied for 3-5 seconds to the edge. The pellet of acrylonitrile polymer burned for 90-110 seconds whereas the pellet containing 5.0% of the polymer of Example 1 only burned for 25 seconds before going out, indicating that the new polymer was an effective flame-retardant.

I claim:
1. A 1:1 addition copolymer selected from the group consisting of poly-[tris(1-aziridinylphosphine oxide-sulfuric acid] and poly-[tris(2-aziridinyl)phosphine sulfide-sulfuric acid].
2. A copolymer as defined in claim 1 in the form of a powder having an average particle size below about 2 microns.
3. The 1:1 addition copolymer poly-[tris(1-aziridinyl) phosphine oxide-sulfuric acid].
4. A copolymer as defined in claim 3 in the form of a powder having an average particle size below about 2 microns.
5. The 1:1 addition polymer poly-[tris(1-aziridinyl) phosphine sulfide-sulfuric acid].
6. A copolymer as defined in claim 5 in the form of a powder having an average particle size below about 2 microns.

References Cited

UNITED STATES PATENTS 2,917,492   12/1959   Reeves _____ 260—78.4

FOREIGN PATENTS 863,055   11/1952   Germany _____ 260—79.3

JOSEPH L. SCHOFER, Primary Examiner

C. A. HENDERSON, JR., Assistant Examiner

U.S. Cl. X.R.

117—136; 252—8.1; 260—2 EN, 823, 864, 897 R, 901, 926

Case 23,339

UNITED STATES PATENT OFFICE
CERTIFICATE OF CORRECTION

Patent No. 3,629,207                    Dated December 21, 1971

Inventor(s) Denis Coleman

It is certified that error appears in the above-identified patent and that said Letters Patent are hereby corrected as shown below:

Column 1, line 47, "oxide-sulfuric acid)" should read -- oxide-sulfuric acid] --.

Column 3, line 43, "It was then moved" should read -- It was then mixed --.

Column 4, line 20, "(1-aziridinylphosphine" should read -- (1-aziridinyl)phosphine --.

Column 4, line 21, "(2-aziridinyl)" should read -- (1-aziridinyl) --.

Signed and sealed this 2nd day of May 1972.

(SEAL)
Attest:

EDWARD M. FLETCHER, JR.              ROBERT GOTTSCHALK
Attesting Officer                    Commissioner of Patents